United States Patent
Bartley et al.

[11] Patent Number: 6,142,110
[45] Date of Patent: Nov. 7, 2000

[54] ENGINE HAVING HYDRAULIC AND FAN DRIVE SYSTEMS USING A SINGLE HIGH PRESSURE PUMP

[75] Inventors: Bradley E. Bartley, Manito; James R. Blass, Bloomington; Dennis H. Gibson, Chillicothe, all of Ill.

[73] Assignee: Caterpillar Inc., Peoria, Ill.

[21] Appl. No.: 09/235,360

[22] Filed: Jan. 21, 1999

[51] Int. Cl.[7] .................. F02D 7/00; F01P 7/02; F01P 7/10

[52] U.S. Cl. .................. 123/41.49; 123/41.11; 123/41.12; 123/446

[58] Field of Search ................ 123/446, 41.49, 123/41.12, 41.11

[56] References Cited

U.S. PATENT DOCUMENTS

| | | | |
|---|---|---|---|
| 2,777,287 | 1/1957 | Tweedale . | |
| 3,217,808 | 11/1965 | Elmer . | |
| 3,659,567 | 5/1972 | Murray . | |
| 4,062,329 | 12/1977 | Rio | 123/41.12 |
| 4,066,047 | 1/1978 | Vidakovic et al. | 123/41.12 |
| 4,189,919 | 2/1980 | Goscenski, Jr. . | |
| 4,223,646 | 9/1980 | Kinder | 123/41.11 |
| 4,285,200 | 8/1981 | Bryne et al. . | |
| 4,377,989 | 3/1983 | Tholen et al. . | |
| 4,487,255 | 12/1984 | Bianchetta et al. | 165/267 |
| 4,738,330 | 4/1988 | Suzuki et al. | 180/141 |
| 4,798,177 | 1/1989 | Oomura et al. | 123/41.12 |
| 4,823,744 | 4/1989 | Omura | 123/41.12 |
| 4,941,437 | 7/1990 | Suzuki et al. | 123/41.12 |
| 5,095,691 | 3/1992 | Yoshimura | 60/289 |
| 5,168,703 | 12/1992 | Tobias . | |
| 5,176,115 | 1/1993 | Campion | 123/179.17 |
| 5,181,494 | 1/1993 | Ausman et al. | 123/446 |
| 5,224,446 | 7/1993 | Okita et al. . | |
| 5,297,523 | 3/1994 | Hafner et al. | 123/456 |
| 5,357,912 | 10/1994 | Barnes et al. | 123/357 |
| 5,531,190 | 7/1996 | Mork | 123/41.12 |
| 5,540,203 | 7/1996 | Foulkes et al. . | |
| 5,678,521 | 10/1997 | Thompson et al. . | |
| 5,697,341 | 12/1997 | Ausman et al. | 123/446 |
| 5,724,924 | 3/1998 | Michels | 123/41.12 |
| 5,839,412 | 11/1998 | Stockner et al. | 123/446 |
| 5,842,452 | 12/1998 | Pattanaik | 123/467 |
| 5,852,997 | 12/1998 | Vanderpoel | 123/446 |
| 6,030,314 | 2/2000 | Brooks et al. | 477/92 |

FOREIGN PATENT DOCUMENTS

| | | |
|---|---|---|
| 35 19 650 A1 | 12/1986 | Germany . |
| 197 11 682 A | 11/1997 | Germany . |
| 196 30 407 A1 | 1/1998 | Germany . |
| 2 320 523 A | 6/1998 | United Kingdom . |

Primary Examiner—Tony M. Argenbright
Assistant Examiner—Hai Huynh
Attorney, Agent, or Firm—Michael B. McNeil

[57] ABSTRACT

An engine comprises a hydraulic system attached to an engine housing that includes a high pressure pump and a hydraulic fluid flowing through at least one passageway. A fan drive system is also attached to the engine housing and includes a hydraulic motor and a fan which can move air over the engine. The hydraulic motor includes an inlet fluidly connected to the at least one passageway.

20 Claims, 3 Drawing Sheets

Fig_2_

ENGINE HAVING HYDRAULIC AND FAN DRIVE SYSTEMS USING A SINGLE HIGH PRESSURE PUMP

GOVERNMENT LICENSE RIGHTS

The U.S. Government has a paid-up license in this invention and the right in limited circumstances to require the patent owner to license others on reasonable terms as provided for by the terms of DE-FC05-970R22605, awarded by the Department of Energy. In other words, this invention was made with Government support under DE-FC05-970R22605 awarded by the Department of Energy. The Government has certain rights in this invention.

TECHNICAL FIELD

The present invention relates generally to engines having fan drive systems and hydraulic systems, and more specifically to fan drive systems and hydraulic systems that share a single hydraulic pump.

BACKGROUND ART

In some applications, cooling fan drive systems installed on engines have been powered by a separate hydraulic pump. For engines including both a hydraulic system and a traditional fan drive system, multiple engine hydraulic pumps were a necessity. To make engines more compact and reliable, it is desirable to reduce the number of engine pumps. Additionally, it is desirable to control the fan drive system independent of engine speed to avoid wasting system energy. While traditional systems have performed magnificently for many years, there remains room for improvement in these areas.

The present invention is directed to overcoming one or more of the problems set forth above.

SUMMARY OF THE INVENTION

An engine comprises a hydraulic system attached to an engine housing that includes a high pressure pump and a hydraulic fluid flowing through at least one passageway. A fan drive system is also attached to the engine housing and includes a hydraulic motor and a fan which can move air over the engine. The hydraulic motor includes an inlet fluidly connected to the at least one passageway.

BEST MODE FOR CARRYING OUT THE INVENTION

Figure 1:
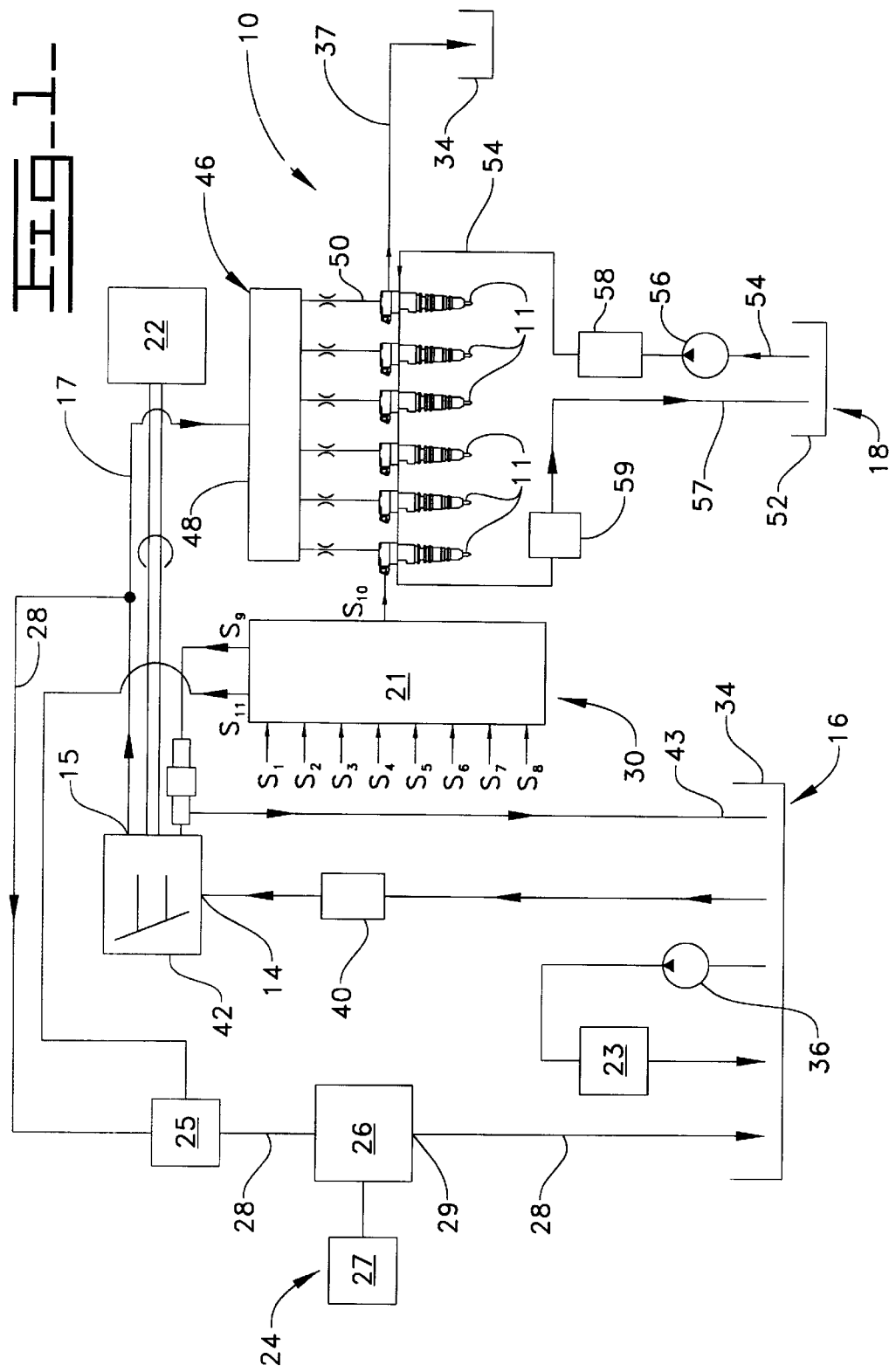
FIG. 1 is a schematic view of a hydraulically actuated system according to the present invention.
Figure 2:
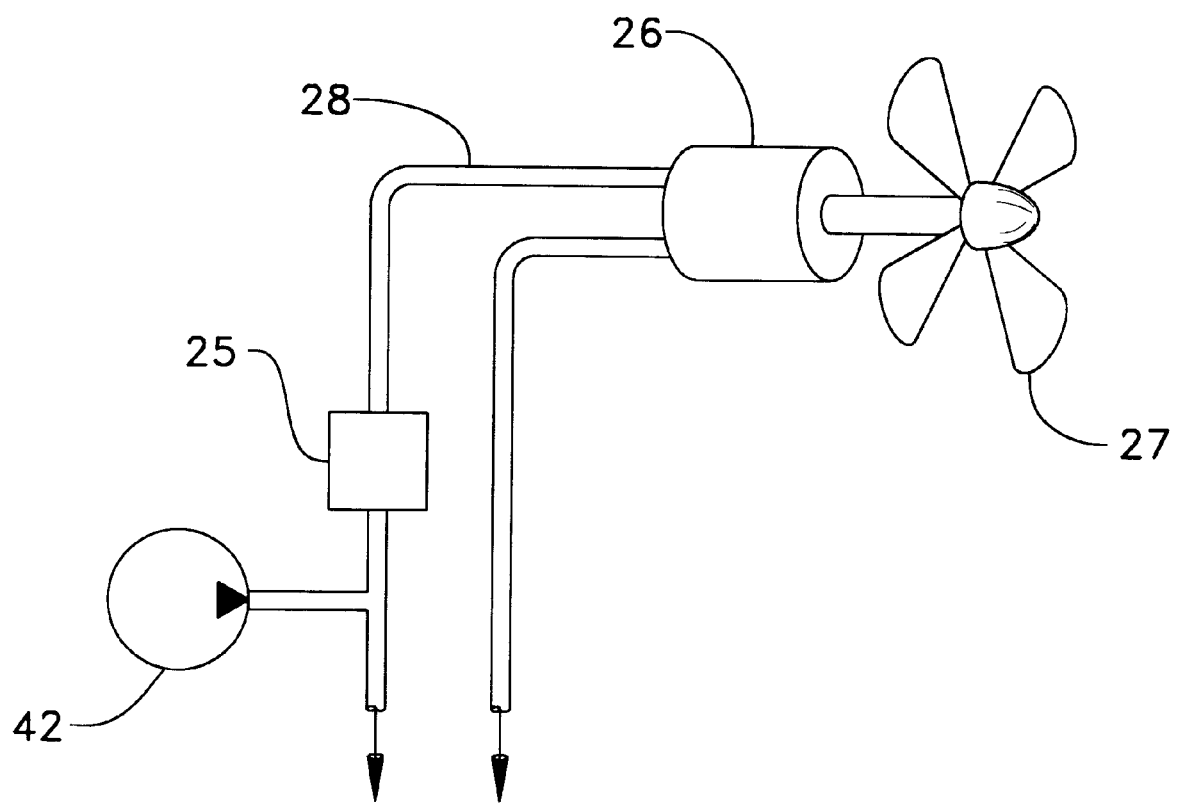
FIG. 2 is a diagrammatic representation of the fan drive system of FIG. 1.

Referring to FIGS. 1 and 2, there is shown a schematic representation of a hydraulically actuated fuel injection system 10 as adapted for a direct injection diesel cycle internal combustion engine 22 and a diagrammatic representation of a fan drive system 24. The fuel injection system 10 includes at least one hydraulically actuated fuel injector 11, all of which are adapted to be positioned in a respective cylinder head bore of engine 22. The fuel injection system 10 includes a source of actuation fluid 16 which supplies actuation fluid to each fuel injector 11, as well as to an engine lubricating circuit 23 and fan drive system 24. While any available engine fluid could be used as the actuation fluid in this system, the present invention utilizes engine lubricating oil. This allows fuel injection system 10 to be connected directly to engine lubricating circuit 23. The fuel injection system 10 also includes a source of fuel 18 for supplying fuel to each fuel injector 11. A computer 30 is also included in fuel injection system 10 to control timing and duration of injection events.

The source of actuation fluid 16 preferably includes an engine oil pan 34, one or more actuation fluid filters 40 and a low pressure pump 36 for supplying oil or actuation fluid to both engine lubricating circuit 23 and fuel injection system 10. Also preferably included in source of actuation fluid 16 is a high pressure pump 42 for generating high pressure in the actuation fluid and at least one high pressure manifold 46. High pressure pump 42 includes an inlet 14 fluidly connected to oil pan 34, and an outlet 15. Both fan drive system 24 and a high pressure common rail 48 are connected to outlet 15. A rail branch passage 50 connects a high pressure actuation fluid inlet of each fuel injector 11 to high pressure common rail 48. Actuation fluid exiting fuel injector 11 flows through a low pressure actuation fluid drain via a recirculation passage 37 to oil pan 34.

Actuation fluid is delivered to fan drive system 24 by high pressure pump 42 via a flow passage 28. Fan drive system 24 preferably includes a fan 27 which is controlled by a hydraulic fan motor 26. Actuation fluid can flow into fan drive system 24 through high pressure pump outlet 15 via flow passage 28. Actuation fluid flowing through flow passage 28 into fan drive system 24 first flows through a flow regulating valve 25. Flow regulating valve 25 can reduce the pressure of the actuation fluid flowing into fan drive system 24 to account for differing pressure needs of fuel injection system 10 and fan drive system 24. In other words, flow regulating valve 25 permits the speed of fan drive system 24 to be set somewhat independent of the speed of engine 22. One end of flow passage 28 connects fan drive system 24 to high pressure pump outlet 15 while a second end connects a fan hydraulic motor outlet 29 to oil pan 34. Thus, actuation fluid exiting fan drive system 24 flows through flow passage 28 to oil pan 34 for recirculation.

The source of fuel 18 preferably includes a fuel supply regulating valve 59 and a fuel circulation and return passage 57 arranged in fluid communication between fuel injectors 11 and a fuel tank 52. Diesel fuel is supplied to fuel injectors 11 via a fuel supply passage 54 which is arranged in fluid communication between fuel tank 52 and the fuel inlet of each fuel injector 11. Diesel fuel being supplied through fuel supply passage 54 travels through a low pressure fuel transfer pump 56 and one or more fuel filters 58.

Fuel injection system 10 is electronically controlled via a computer 30 which includes an electronic control module 21 that controls the timing and duration of injection events and pressure in high pressure manifold 46. Based upon a variety of input parameters including temperature, throttle, engine load, etc. ($S_1$–$S_8$) electronic control module 21 can determine a desired injection timing, duration and manifold pressure to produce some desired performance at the sensed operating conditions. Electronic control module 21 also controls flow regulating valve 25 to ensure that actuation fluid entering hydraulic fan motor 26 is in accordance with the cooling needs of the engine, if any.

Figure 3:
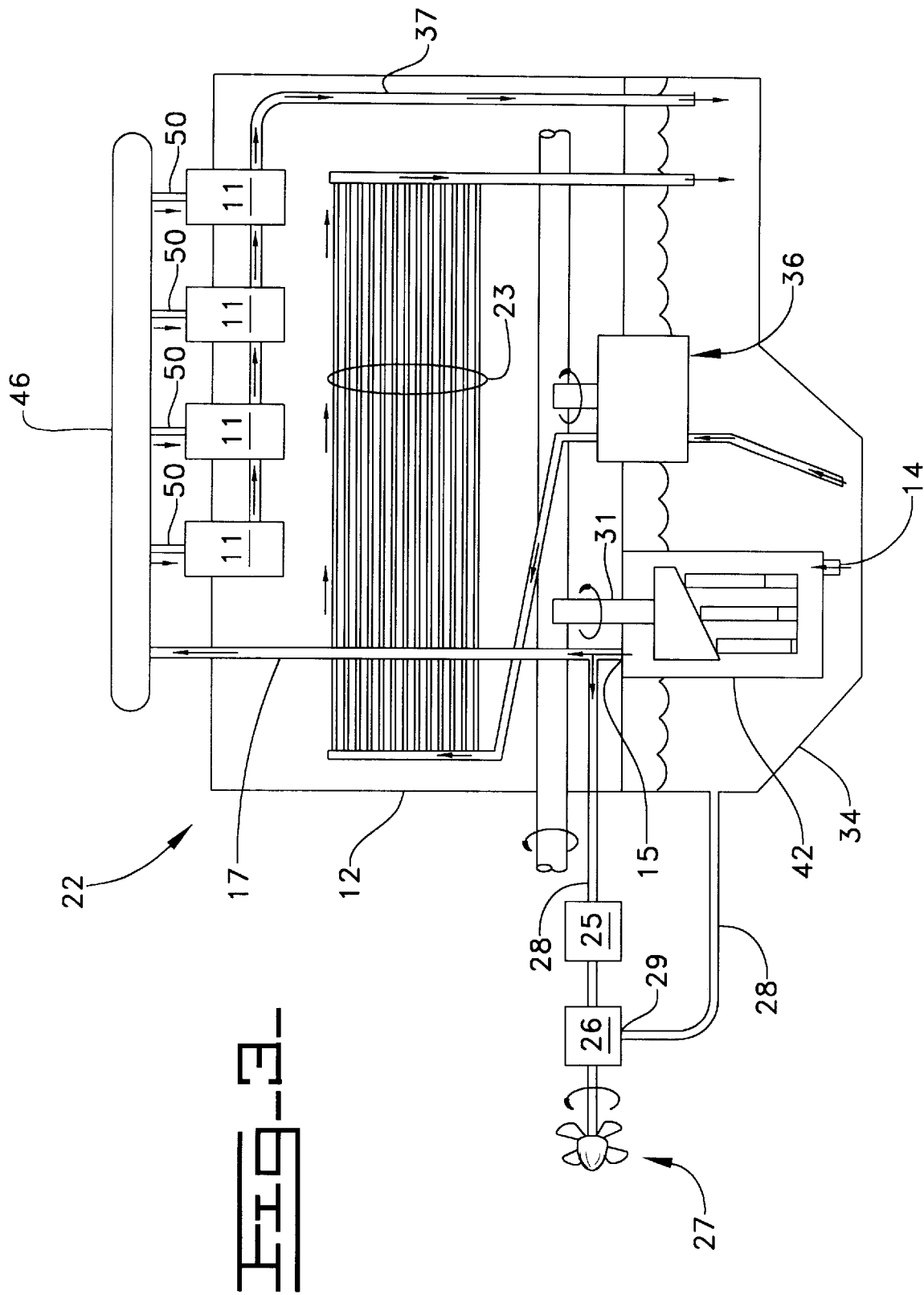
FIG. 3 is a diagrammatic view of the engine of the hydraulic system on FIG. 1.

Referring now to FIG. 3, engine 22 includes an engine housing 12. Oil pan 34 filled with an amount of lubricating oil is contained within engine 22 and defined in part by engine housing 12. Lubricating circuit 23 is contained within engine 22, including low pressure pump 36. Operating in parallel to lubricating circuit 23 is fuel injection system 10 which preferably utilizes lubricating oil as a hydraulic fluid in actuating hydraulically actuated fuel injectors 11. Fuel injection system 10 also includes high pressure pump 42 which is positioned in oil pan 34 and partially submerged in the lubricating oil. Recall that while any available engine fluid could be used by fuel injection system 10 as actuation fluid, the present invention preferably utilizes engine lubricating oil. This allows fuel injection system 10 to be directly connected to oil pan 34. Pump inlet 14 is positioned on high pressure pump 42 to be near the bottom of oil pan 34 in order to always be exposed to a ready supply of lubricating oil.

A first portion of pressurized oil exits high pressure pump 42 through outlet 15 and flows through a high pressure supply passageway 17 to an inlet of a high pressure manifold 46. High pressure manifold 46 includes a plurality of outlets, each of which is connected to a respective branch passage 50. Each branch passage 50 is connected to an inlet of an individual fuel injector 11. Each fuel injector 11 includes an outlet that empties into recirculation passage 37 which allows lubricating oil to return to oil pan 34 for recirculation.

A second portion of pressurized oil exits high pressure pump 42 through outlet 15 and flows through flow regulating valve 25 via flow passage 28 to an inlet of hydraulic fan motor 26. Hydraulic fan motor 26 includes an outlet 29 that empties into flow passage 28 which allow lubricating oil to return to oil pan 34 for recirculation.

Industrial Applicability

Recall that the actuation fluid used by the present invention is engine lubricating oil. Actuation fluid pumped by low pressure pump 36 is directed through engine lubricating circuit 23. After this actuation fluid has performed work in engine lubricating circuit 23 it flows back into oil pan 34 where it will be recirculated in a conventional manner. Lubricating oil is also pumped from oil pan 34 by high pressure pump 42 to fan drive system 24 and fuel injection system 10.

Actuation fluid pumped by high pressure pump 42 is directed to both fan drive system 24 and high pressure manifold 46. A first amount of actuation fluid exits high pressure pump 42 through outlet 15 and flows through flow regulating valve 25 into fan drive system 24, via flow passage 28. Actuation fluid flowing through flow passage 28 is channeled through hydraulic fan motor 26 where it acts to power fan 27. This first amount of actuation fluid is returned to oil pan 34 for recirculation by flow passage 28 upon exiting fan drive system 24. A second amount of actuation fluid exits high pressure pump 42 through outlet 15 and flows to high pressure manifold 46. The actuation fluid flows into fuel injectors 11 via a series of rail branch passages 50 from high pressure manifold 46. After performing work in fuel injectors 11, actuation fluid flows through recirculation passage 37 to oil pan 34 for recirculation.

The present invention is believed to improve the robustness of the complete engine by eliminating the need for one pump. The present invention also improves upon previous fan drive systems by consolidating the high pressure hydraulic system pump with the fan drive pump. By powering the fan drive system with the high pressure hydraulic system pump, the need for multiple pumps is eliminated, thus reducing the amount of engine space needed for these systems. In addition, inclusion of flow regulating valve 25 allow the speed of fan 27 to be somewhat independent of the speed of engine 22 to avoid wasting energy.

It should be understood that the above description is intended only to illustrate the concepts of the present invention, and is not intended to in any way limit the potential scope of the present invention. For instance, while the present invention has been shown as part of a vehicle engine, it should be appreciated that this invention has applications in engines not included in vehicles. For instance, the present invention could be part of an engine generator set. Thus, various modifications could be made without departing from the intended spirit and scope of the invention as defined by the claims below.

What is claimed is:

1. An engine comprising:

an engine housing;

a hydraulic system attached to said engine housing and including a hydraulic fluid flowing through at least one passageway and a high pressure pump;

a fan drive system attached to said engine housing and including a hydraulic motor and a fan positioned to move air over said engine;

said hydraulic motor has an inlet fluidly connected to said at least one passageway; and a flow regulating valve positioned in said at least one passageway and having a position at which said hydraulic fluid flows simultaneously through said hydraulic system and said fan drive system.

2. The engine of claim 1 wherein said engine housing includes an oil pan;

said high pressure pump having an inlet fluidly connected to said oil pan; and said hydraulic fluid being an amount of lubricating oil originating from said oil pan.

3. The engine of claim 1 wherein said hydraulic system includes at least one hydraulic device attached to said engine; and said hydraulic motor is fluidly connected to said high pressure pump.

4. The engine of claim 1 wherein said hydraulic system includes a plurality of hydraulically actuated fuel injectors.

5. The engine of claim 1 wherein said hydraulic system includes a high pressure common rail and a plurality of hydraulically actuated devices;

a pressure control device attached to said common rail; and an electronic control module being in communication with, and capable of controlling, said pressure control device and said hydraulically actuated devices.

6. The engine of claim 1 further comprising an electronic control module capable of controlling said flow regulating valve.

7. A combined hydraulic and fan drive system comprising:

an engine having an engine housing;

a high pressure pump having at least one outlet;

a fan drive system attached to said engine housing and having a flow passage with one end fluidly connected to said at least one outlet;

a hydraulic system attached to said engine housing and having a plurality of hydraulically actuated devices with inlets fluidly connected to said at least one outlet; and a flow regulating valve positioned between said flow passage and said at least one outlet, and having a position at which both said fan drive system and said hydraulic system are fluidly connected to said high pressure pump.

8. The system of claim 7 wherein said plurality of hydraulically actuated devices are attached to said engine.

9. The system of claim 8 further comprising an electronic control module in communication with and being capable of controlling said plurality of hydraulic devices.

10. The system of claim 9 wherein said electronic control module is capable of controlling said flow regulating valve.

11. The system of claim 10 wherein said engine includes an oil pan; and an inlet of said high pressure pump is fluidly connected to said oil pan.

12. The system of claim 11 wherein said fan drive system includes a hydraulic motor; and said hydraulic motor has an outlet connected to said oil pan.

13. The system of claim 12 wherein said hydraulic system includes a high pressure common rail, and a rail pressure control device attached to said common rail.

14. A combined hydraulically actuated fuel injection and fan drive system comprising:

an engine having an engine housing;

a high pressure pump attached to said engine housing and having an inlet fluidly connected to a source of fluid and at least one outlet;

a fan drive system attached to said engine housing and having a flow passage with one end fluidly connected to said at least one outlet;

a high pressure common rail fluidly connected to said at least one outlet;

a plurality of hydraulically actuated fuel injectors fluidly connected to said common rail and attached to said engine housing; and a flow regulating valve positioned between said flow passage and said at least one outlet, and having a position at which both said fan drive system and said plurality of hydraulically actuated fuel injectors are fluidly connected to said high pressure pump.

15. The system of claim 14 wherein said engine includes an oil pan and said source of fluid is said oil pan.

16. The system of claim 15 wherein each of said fuel injectors includes an fuel inlet fluidly connected to a source of fuel, and a hydraulic fluid inlet fluidly connected to said common rail.

17. The system of claim 16 wherein said high pressure pump is operably connected to said engine.

18. The system of claim 17 further comprising an electronic control module in communication with and being capable of controlling said hydraulically actuated fuel injectors.

19. The system of claim 18 wherein said electronic control module is in communication with and capable of controlling said flow regulating valve.

20. The system of claim 19 further comprising a rail pressure device attached to said common rail.

* * * * *